US012799796B2

(12) United States Patent
Charge et al.

(10) Patent No.: US 12,799,796 B2
(45) Date of Patent: Nov. 17, 2026

(54) DEVICE FOR CLOSING OFF AN APERTURE MADE IN THE BODYSHELL OF A MOTOR VEHICLE, AND CORRESPONDING VEHICLE

(71) Applicant: ADVANCED COMFORT SYSTEMS FRANCE SAS—ACS FRANCE, Bressuire (FR)

(72) Inventors: Philippe Charge, Bressuire (FR); Arnaud Bonnin, La Chapelle Saint Laurent (FR); Sébastien Guilloteau, Faye l'Abbesse (FR)

(73) Assignee: ADVANCED COMFORT SYSTEMS FRANCE SAS—ACS FRANCE, Bressuire (FR)

( * ) Notice: Subject to any disclaimer, the term of this patent is extended or adjusted under 35 U.S.C. 154(b) by 0 days.

(21) Appl. No.: 18/292,947

(22) PCT Filed: Jul. 27, 2022

(86) PCT No.: PCT/EP2022/071122
§ 371 (c)(1),
(2) Date: Jan. 29, 2024

(87) PCT Pub. No.: WO2023/006838
PCT Pub. Date: Feb. 2, 2023

(65) Prior Publication Data

US 2025/0092731 A1 Mar. 20, 2025

(30) Foreign Application Priority Data

Jul. 30, 2021 (EP) .................................... 21188946

(51) Int. Cl.

*E05F 15/646* (2015.01)
*E05D 15/10* (2006.01)

(52) U.S. Cl.

CPC ........ *E05F 15/646* (2015.01); *E05D 15/1047* (2013.01); *E05Y 2201/654* (2013.01); *E05Y 2201/672* (2013.01); *E05Y 2900/55* (2013.01)

(58) Field of Classification Search

CPC ..... E05F 15/643; E05F 15/646; B60J 1/1853; B60J 1/16; E05Y 2201/672; E05Y 2201/654; E05D 15/1047; E05D 15/1042

See application file for complete search history.

(56) References Cited

U.S. PATENT DOCUMENTS 5,822,922 A * 10/1998 Grumm ................ E05F 11/535 49/380
8,151,519 B2 * 4/2012 Bello .................... E05F 15/643 49/121

(Continued)

FOREIGN PATENT DOCUMENTS

EP 1094245 A2 * 4/2001 ............ E05F 15/681
EP 2479366 A2 7/2012

(Continued)

OTHER PUBLICATIONS

CN 113685126 (Year: 2021).*

*Primary Examiner* — Catherine A Kelly
*Assistant Examiner* — Patrick B. Ponciano
(74) *Attorney, Agent, or Firm* — S. J. INTELLECTUAL PROPERTY LTD.

(57) ABSTRACT

A device comprising a fixed panel, in which an opening is defined, and at least one sliding movable panel guided along two guide rails between a closing-off position, closing the opening, and at least one opening position, each of the guide rails carrying at least one shutter guided in translation in the rail, actuation means acting on one of the shutters to ensure a translational movement of these in the guide rails and the passage of the movable panel from the closing off position into the at least one sliding position, and vice versa, and two (Continued)

synchronization cables ensuring a synchronisation of the movement of the shutters, each shutter carrying a movable slider movable relative to the shutter and receiving one end of each of the synchronisation cables.

10 Claims, 8 Drawing Sheets

(56) References Cited

U.S. PATENT DOCUMENTS

| | | | | |
|---|---|---|---|---|
| 8,562,063 | B2 * | 10/2013 | Giret | E05D 15/1047<br>296/146.15 |
| 8,769,872 | B2 * | 7/2014 | Maltaverne | B60J 1/16<br>49/210 |
| 8,813,425 | B2 * | 8/2014 | Ash, Jr. | E05D 15/06<br>49/380 |
| 8,881,458 | B2 * | 11/2014 | Snider | B60J 1/002<br>49/213 |
| 10,518,611 | B2 * | 12/2019 | Murasawa | B60J 1/1853 |
| 10,882,382 | B2 * | 1/2021 | Otsubo | E05F 11/04 |
| 11,261,633 | B2 * | 3/2022 | Kuroda | E05F 15/646 |
| 11,466,494 | B2 * | 10/2022 | Yun | E05D 15/10 |
| 2007/0277442 | A1 * | 12/2007 | Dery | E05F 15/638<br>49/362 |
| 2025/0214398 | A1 * | 7/2025 | Giret | B60J 1/085 |

FOREIGN PATENT DOCUMENTS

| | | | | | |
|---|---|---|---|---|---|
| EP | 3722547 | A1 | * | 10/2020 | E05F 15/643 |
| GB | 2311326 | A | * | 9/1997 | E05F 15/646 |
| JP | 2006132255 | A | * | 5/2006 | |
| KR | 100862719 | B1 | * | 10/2008 | B60J 5/04 |
| WO | 2010146185 | A2 | | 12/2010 | |
| WO | WO-2012052464 | A1 | * | 4/2012 | B60J 7/0573 |

* cited by examiner

DEVICE FOR CLOSING OFF AN APERTURE MADE IN THE BODYSHELL OF A MOTOR VEHICLE, AND CORRESPONDING VEHICLE

FIELD OF THE INVENTION

The field of the invention is that of equipment for openings, used in particular in motor vehicles.

More specifically, the invention relates to devices for closing off an opening formed in a structural element, for example in the bodyshell of a vehicle, or in a door of the vehicle, and comprising a sliding movable part capable of releasing or closing an aperture, in presenting a flush aspect when seen from the exterior.

In particular, the invention may equip different types of structures, such as caravans, camping-cars, coaches and buses, minibuses, trucks, vans, boats, etc.

Such devices, developed since several years by the Holder of the present application, are known in particular as "flush openings".

In other words, these devices are designed so that, seen from the exterior, they present a flush or almost flush appearance between the bodywork, or more generally the wall or the structure, and the fixed panel of the device.

PRIOR ART

The general principle this technique is described especially in the patent documents EP-0 778 168 and EP-0 857 844.

The device for closing off (called hereafter "flush opening") comprises a fixed part and a part movable relatively to this fixed part, or sliding panel.

The movable part is connected to the fixed assembly by functional elements which ensure the required movability and which are affixed onto the face of the fixed part turned towards the interior of the vehicle.

These functional elements, or rails, ensure function of guidance and holding of the movable panel. They are placed on the face directed towards the interior of the vehicle, remotely enough from the edges, or from the periphery, of the fixed part so that this periphery could be directly secured to the edges of the opening, without the rails interfering. Thus, it is possible to get rid of the presence of a connecting frame between the edges of the opening and the fixed part.

This fixed part may be made into one or more elements (placed side-by-side in the same plane), for example made of glass or of polycarbonate.

Thus, such a flush opening may be mounted completely irrespective of the vehicle, and affixed, from the exterior, in the compartment defined to this end by the opening, or the compartment, defined in the body, or more generally in the wall.

The edges of the fixed part are secured, for example using a glue bead, to the edges of the opening, without any other intermediate connecting element.

From an aesthetical perspective, when viewed from the exterior, the flush opening has a flush smooth aspect, since no frame is necessary over the contour of the opening formed in the fixed assembly.

Hence, to ensure the movement of the movable part, generally consisting of a transparent panel, a guide device is provided including first and second guide rails fixedly mounted on the fixed part (or fixed structure) of the opening, on either side of the opening closed by the movable panel.

The movable panel is mounted on the rails, so as to slide for example acceding to a longitudinal direction, in a sliding plane between one (or more) opening positions and a closing-off position, in which it closes the opening.

To maximise the flush aspect, it has been proposed that, in the closing-off position, the movable panel fits in the plane of the fixed part, when passing from a clear intermediate position, in the sliding plane, opposite the opening and cleared from the latter, into the closing-off position.

It should be noted that the term "plane" should herein be understood in its broad meaning: the plane formed by the opening is sometimes curved, according to one, and possibly two, directions to adapt to the shape of the structure (this also justifies, in some cases, the term "substantially" used in the description and the claims).

The movable panel may be moved manually or using an electric motor. In the latter case, actuation means act on the movable panel in order to move the latter between a closing-off position and at least one opening position. In particular, the actuation means may be in the form of a cable (called Push-Pull cable) connected to the electric motor so as to pull or push the movable panel. The actuation means may also be in the form of a rack or cables such as bicycle cables.

To promote opening and closing of the movable panel, a known technique consists in implementing, in each of the guide rails, a shutter guided in translation in the rail, as described for example in the patent document WO2010/146185. Each shutter allows controlling the movement of the movable panel, on the one hand, to clear it from or fit it into the opening formed in the fixed panel (Y axis) and, on the other hand, to slidably guide it (X axis). Such a shutter may comprise two guide tracks capable of cooperating respectively with two fixed pins carried by the movable panel, or vice versa.

The cooperation of the guide tracks with the fixed pins allows obtaining a shift, conventionally a sway, of the movable panel so as to move the lateral edges of the movable panel relative to the fixed part.

The movement of the movable panel relative to the fixed part may be decomposed into two movements, for opening:

- a movement towards the interior of the vehicle (according to the Y axis) relative to the plane formed by the fixed part, enabling the passage from a closed and locked position, in which the movable panel is in the same plane as the fixed part and the opening, into a clear intermediate position, in which the movable panel is offset with respect to the fixed part opposite the opening and cleared from the latter, in a sliding plane, so as to enable this sliding—the movable panel is thus movable according to a clear direction perpendicular to the sliding direction;
- a movement in the sliding plane (according to the X axis), parallel to the plane formed by the fixed part.

The passage from the clear intermediate position into the closing-off position is done symmetrically.

At the beginning of the opening movement and at the end of the closing off movement, i.e. during the sway phase, the movements of the two shutters are performed according to opposite directions, namely according to opposite directions according to the X axis. The shutters also move according to the Y axis during the sway (but in the same direction).

In order to guarantee a good opening/closing effectiveness, the movement of the shutters should be synchronised. For this purpose, synchronisation cables are implemented to link the shutters to one another. Thus, during the sway phase, the movements of the ends of these synchronisation cables are also performed according to opposite directions since they are linked to the shutters.

More specifically, the movement of one of the shutters, for example the lower shutter, is transmitted to the other shutter, for example the upper shutter, by the synchronisation cables. Thus, at the beginning of the opening movement, the lower shutter pulls the front synchronisation cable (X direction) which pulls the upper shutter in the direction (−X direction) opposite to that of the lower shutter. At the end of the closing off movement, the lower shutter pulls the rear synchronisation cable (−X direction) which pulls the upper shutter in the direction (X direction) opposite to that of the lower shutter.

The successive movement of the edges of the movable panel relative to the fixed part, and therefore the asymmetric movement of the shutters, causes numerous direction changes and considerable loads on the cables.

This could generate frictions and axial and radial loads which, over time, are harmful and could result in a deterioration of the cables, of the shutters, of the movable panel and/or of the fixed part.

Moreover, the Applicant has noticed that the distances between the hooking points of the ends of the synchronisation cables and the outlets of the synchronisation cables are substantially different. Indeed, although the movement of the ends of the synchronisation cables according to the Y axis is common, the movement according to the X axis differs according to the angle of rotation of the cable with respect to its hooking point on the shutter. Hence, there is a distortion in the kinematics which could amount to up to 5%, which could result in defects, frictions, jams and even deteriorations.

Hence, there is a need to provide a more effective and more reliable device for closing off an opening, which in particular enables locking and unlocking, and more generally opening and closing, that are easy, intuitive and requiring no considerable effort.

There is also a need to provide a closing off device which does not induce harmful and undesirable effects (such as frictions or deteriorations) between the synchronisation cables and the shutters, the movable panel, or the fixed part, or to the very least reduce such effects.

There is also a need to provide a new technique for guiding a movable panel in an opening for closing off a structure, such as a motor vehicle or the like, enabling the passage from a closing-off position, flush with the fixed panel, into a sliding position, which is simple, effective and reliable.

Moreover, with such opening/closing off kinematics of the opening, it is noticed that the tension of the synchronisation cables has a major role in the proper operation of the opening.

A simple method allowing tensioning the synchronisation cables consists in connecting at least one of the ends of the synchronisation cable to a (tension, compression, torsion) spring.

A drawback of this solution is that the load exerted by the spring on the cable could resist the opening or closing movement of the opening. Hence, such a spring might increase the efforts that the user or the motor has to exert to open/close the opening.

Another drawback of this solution lies in the fact that it is difficult to assemble the synchronisation cable while seeking to achieve an optimum tension of the spring.

Furthermore, a spring sized so as to exert a sufficient/optimum tension on the synchronisation cable could sometimes turn out to be excessively large to enable fitting thereof in the allocated compartment in the vehicle.

Hence, the current solution is not always satisfactory, and an objective of at least one embodiment of the invention is to provide a solution to this problem.

SUMMARY OF THE INVENTION

The technique of the invention allows solving at least some of the drawbacks of the prior art. More specifically, the invention relates to a device for closing off an aperture formed in a structure, comprising:

- a fixed structure, in which an opening is defined, and at least one sliding movable panel guided along two guide rails mounted on one face of said fixed panel, between a closing-off position, closing said opening, in a first plane defined by said fixed panel, called closing-off plane, and at least one opening position, in a second plane, called sliding plane, substantially parallel to said closing-off plane,
- each of said guide rails carrying at least one shutter guided in translation in said rail, each shutter comprising two guide tracks, respectively two fixed pins, capable of cooperating respectively with two fixed pins, respectively two guide tracks, carried by a frame carried by said movable panel,
- actuation means acting on one of said shutters to ensure a translational movement of these in said guide rails, and the passage of the movable panel from said closing-off position into said at least one sliding position, and vice versa,
- two synchronisation cables each circulating in one of the lateral edges of said frame and ensuring a synchronisation of the movement of said shutters.

According to the invention, each shutter carries a slider movable relative to said shutter and receiving one end of each of said synchronisation cables, so that the movement of said ends of said synchronisation cables is substantially parallel to the plane of said movable panel during the movement of said shutters ensuring the passage of said movable panel from said closing-off position into said at least one sliding position, and vice versa.

In this manner, when the slider is mounted on the shutter, a translation of the slider relative to the shutter, substantially according to the Y axis, is authorised during the phase of sway of the movable panel. In other words, the slider is slidably guided relative to the shutter during the transverse movement (according to the Y axis) of the shutters.

This degree of freedom enables the slider to absorb/compensate the movement of the shutter according to the Y axis during the movement of the movable panel between the sliding plane and the plane defined by the fixed part. Consequently, the slider does not move transversely (according to the Y axis) relative to the frame of the movable panel, since the movement according to the Y axis of the shutter is performed within the slider. Hence, the slider does not move according to the axis.

This absorption of the movement of the shutters according to the Y axis by the slider, during the sway, enables the synchronisation cables to always move, i.e. pull or act, substantially according to their respective axis, namely the X axis.

According to a particular aspect of the present technique, each slider is slidably guided relative to the corresponding shutter according to an axis substantially perpendicular to the axis of movement of said cables.

According to another particular aspect of the present technique, each slider, respectively each shutter, comprises a fork cooperating with a pin carried by the corresponding shutter, respectively the corresponding slider.

According to still another particular aspect of the present technique, at least one of said sliders comprises means for controlling the tension of at least one of said synchronisation cables.

According to a first embodiment of the present technique, said means for controlling the tension comprise a return spring.

According to a particular aspect of this first embodiment of the present technique, said means for controlling the tension comprise means for setting the position of the hooking point of at least one cable end in said slider.

According to another particular aspect of this first embodiment of the present technique, said means for controlling the tension comprise at least one tensioner receiving the end of one of said synchronisation cables and penetrating into a receiving compartment formed in said slider, said tensioner being able to take at least two distinct positions in said receiving compartment, so as to enable setting of the tension of the corresponding cable.

According to still another particular aspect of this first embodiment of the present technique, said tensioner has at least one blocking lug capable of cooperating with said compartment.

According to another particular aspect of the first embodiment of the present technique, said receiving compartment has at least two blocking teeth capable of cooperating with said blocking lug(s) of said tensioner so that setting of the tension of said synchronisation cable depends on the depth of insertion of the tensioner in said compartment of said slider.

According to a second embodiment of the present technique, said means for controlling the tension comprise means for setting the length of the portion of at least one of said cables inside said slider.

According to a particular aspect of this second embodiment of the present technique, said setting means comprise a cam imparting, according to its position, a variable offset on said cable.

According to another particular aspect of this first embodiment of the present technique, said cam is secured to a gear wheel cooperating with at least two blocking lugs formed in said slider, and corresponding to at least two distinct tension settings.

The invention also relates to a motor vehicle comprising at least one closing off device as described before.

LIST OF THE FIGURES

The proposed technique, as well as the different advantages thereof, will be understood more easily in light of the following description of two illustrative and non-limiting embodiments thereof, and from the appended drawings wherein.

Figure 17:
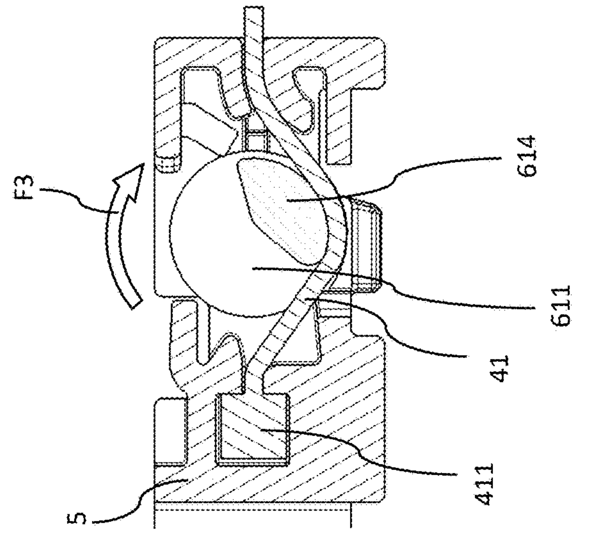
Figure 16:
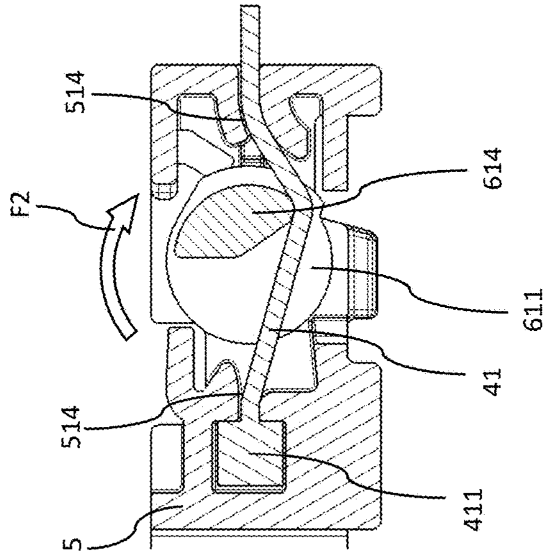
FIG. 16 illustrates another top sectional view of the slider and of a tensioner according to the second embodiment, showing how a synchronisation cable is tensioned.
Figure 15:
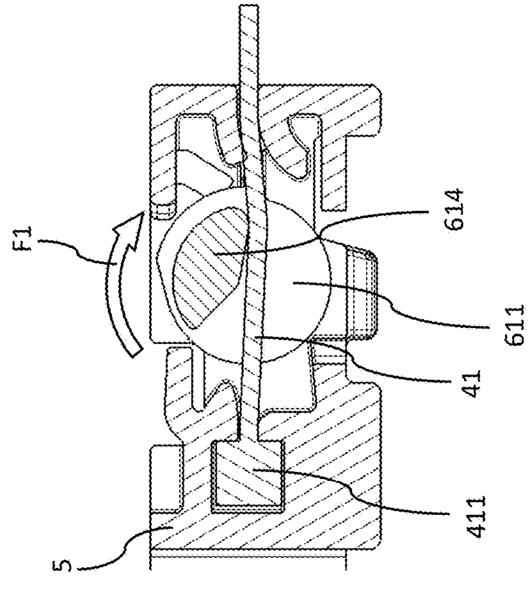
FIG. 15 illustrates a top sectional view of the slider and of a tensioner according to the second embodiment, showing how a synchronisation cable is tensioned.
Figure 18:
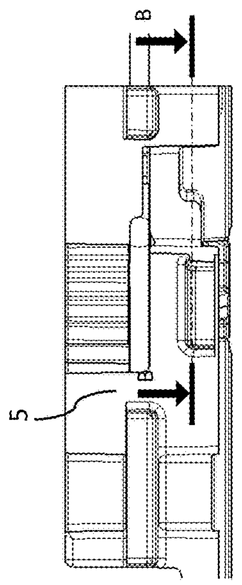
Figure 19:
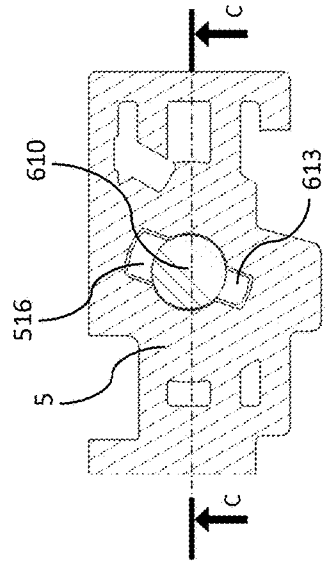
Figure 20:
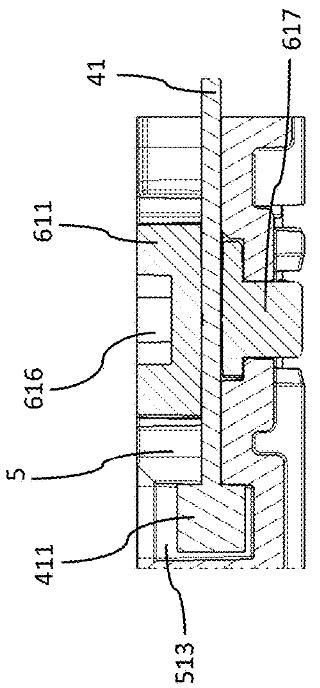
Figure 21:
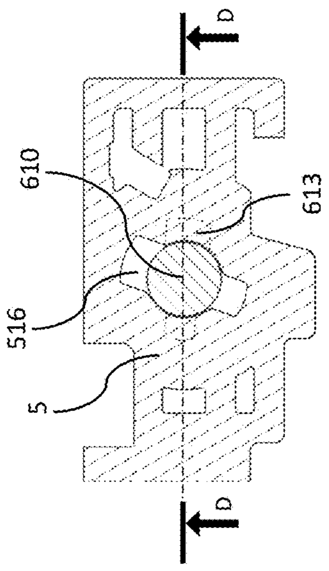
Figure 22:
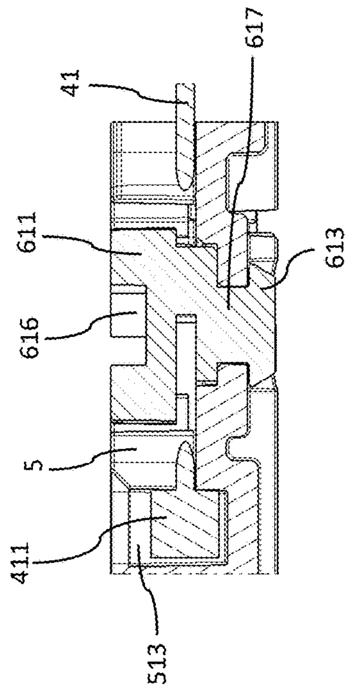

FIG. 17 also illustrates another top sectional view of the slider and of a tensioner according to a second embodiment, showing how a synchronisation cable is tensioned;

FIG. 18 illustrates a partial and side view of the slider and of a tensioner according to the second embodiment;

FIG. 19 illustrates a sectional view of the slider and of a tensioner of FIG. 16, in the mounting position, according to the plane B-B illustrated in FIG. 18;

FIG. 20 illustrates a sectional view of the slider and of a tensioner of FIG. 15, in the mounting position, according to the plane C-C illustrated in FIG. 19;

FIG. 21 illustrates a sectional view of the slider and of a tensioner of FIG. 16, in the tensioning position, according to the plane B-B illustrated in FIG. 18;

FIG. 22 illustrates a sectional view of the slider and of a tensioner of FIG. 16, in the tensioning position, according to the plane D-D illustrated in FIG. 21.

DETAILED DESCRIPTION OF THE INVENTION

Next, different embodiments of the proposed techniques are illustrated, treated as mere illustrative, and non-limiting, examples, with reference to FIGS. 1 to 22.

General Operation of the Opening

Figure 1:
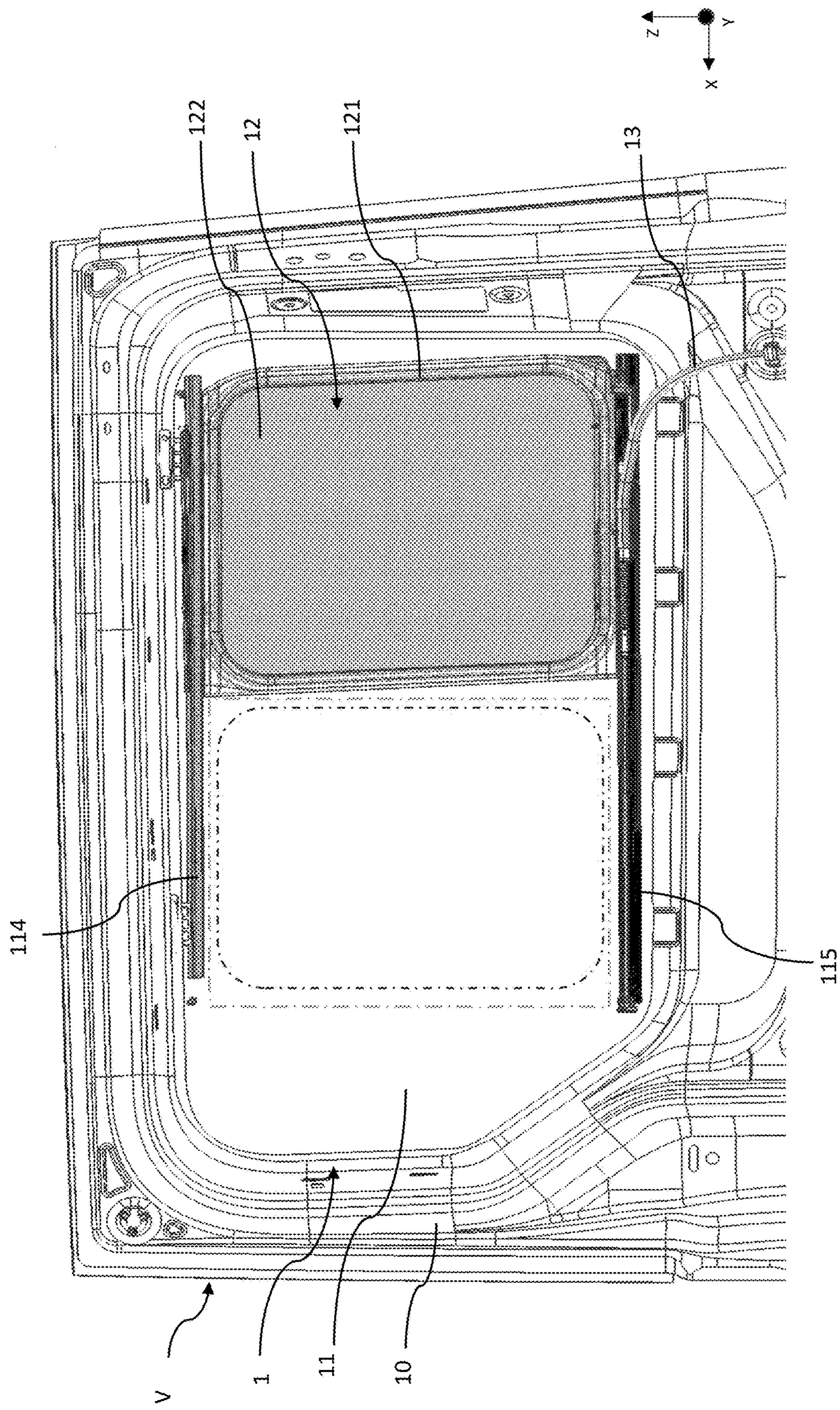
FIG. 1 illustrates an example of a closing off device, or flush opening, according to the prior art.

FIG. 1 illustrates a flush opening with a slidably movable panel viewed from interior the vehicle.

Such a flush opening 1 is in the form of an assembly, or closing off device, ready to be placed in a aperture (i.e. an opening, or a "hole") formed in the body 10 (lateral wall, for example) or a door, or more generally in the structure of a vehicle (or of a travel trailer or a camping-car, for example), or more generally of a wall having to receive a closing off device provided with a door leaf.

Such a closing off device comprises a fixed part 11, i.e. remaining fixed with respect to the structure 10 receiving it, and a slidably movable panel, or sliding panel, 12, movable relative to the fixed part 11.

In particular, the fixed part 11, also called fixed panel, may be made of glass or of polycarbonate, into one or more elements.

The fixed part 11 is pierced with an opening closed by the movable panel 12 in the position of FIG. 1 and extending in the same plane as the fixed part 11.

In particular, this movable panel 12 includes a glazed portion 122 and a frame 121.

Guide rails, respectively an upper rail 114 and a lower rail 115, are affixed by gluing onto the face of the fixed part 11 directed towards the interior of the vehicle.

It should be noted that these rails are brought away from the contour of the fixed part 11, and doe no contribute to, or affect, securing of the latter to the edge of the opening.

The rails 114 and 115, which are substantially parallel in this example, hold and slidably guide the movable panel 12, which has a frame 121 secured to the rails 114, 115.

The movable panel 12 may be moved along the rails 114, 115, in a sliding plane substantially parallel to the plane defined by the fixed part 11.

The movable panel 12 may be brought to completely close the opening of the fixed part 11 (FIG. 1) or partially or totally clear this opening.

Thus, the movable panel 12 may take one or more opening positions, according to its position with respect to the rails 114, 115.

Moreover, the movable panel 12 can move perpendicularly to the plane defined by the fixed part 11, so as to close the opening, in a closing-off position (FIG. 1), in which it is flush with this fixed part 11, so as to propose a flush assembly (body 10, fixed part 11 and movable part 12).

Moreover, the face of the fixed part 11 turned towards the interior of the vehicle carries a sealing gasket (not shown) glued over the contour of the opening, the end of the lip of which bears on the movable panel 12, when the latter is in the closing-off position.

In one variant, the sealing gasket may be mounted on the frame 121 of the movable panel 12, so as to come into contact with the fixed part 11.

The upper rail 114 carries an upper shutter 2 and the lower rail 115 carries a lower shutter 3, each shutter bearing two slots (not illustrated), or tracks, located respectively in the vicinity of each lateral edge of the movable panel 12 and cooperating with a front and rear pin (not illustrated) secured to an edge of the movable panel 12.

Thus, each shutter 2, 3 is slidably guided in a rail 114, 115, according to an axis parallel to the X axis, i.e. the axis corresponding to the length of the vehicle.

More specifically; the upper 114 and lower 115 rails are conventional rails which comprise a bottom wall and two lateral walls extending perpendicularly to the bottom wall. The other end of the lateral walls has a short return allowing receiving and holding the upper 2 and lower 3 shutters.

Hence, the rails are capable of receiving the shutters so that these could slide longitudinally in the rails according to the X axis. Thus, the rails are simple and inexpensive to manufacture, since they ensure guidance according to one single axis, the shutters ensuring movement according to the Y axis.

Each of the upper 2 and lower 3 shutters is substantially in the form of a bar with dimensions suited to slide in the guide rails 114, 115 and has front and rear tracks capable of cooperating with pins carried by the movable panel 12.

More specifically, the shutters 2, 3 comprise a track, called front track, which controls the movement of the distal portion of the movable panel 12 (the portion of the panel the closest to the front of the vehicle) and a track, called rear track, which controls the movement of the proximal portion of this same movable panel 12, opposite to the distal portion.

For example, the tracks of the upper 2 and lower 3 shutters have substantially identical shapes. Many track shape variants may be considered depending on the desired guidance of the frame 121 of the movable panel 12 relative to the shutters 2, 3. In particular, different shapes allow selecting which edge of the movable panel 12 should be swayed at first during opening of the movable panel 12.

During the movement of the shutters, these tracks allow driving the movable panel and enabling movement thereof, according to the X and Y axes, between the closing-off position and the opening position(s).

More specifically, the movement of the movable panel 12 relative to the fixed part 11 may be decomposed into two independent movements:

- a perpendicular movement (according to the Y axis) towards the interior of the vehicle in two steps (called sway) relative to the plane formed by the fixed part 11, enabling the passage from a closed and locked position, in which the movable panel 12 is in the same plane as the fixed part 11 and the opening, into a clear intermediate position, in which the movable panel 12 is offset with respect to the fixed part 11 opposite the opening and cleared from the latter, in a sliding plane, so as to enable this sliding—the movable panel 12 is thus movable according to a clear direction perpendicular to the sliding direction;
- a movement in the sliding plane (according to the X axis), parallel to the plane formed by the fixed part 11.

The passage from the clear intermediate position into the closing-off position is done symmetrically.

It should be noted that the movements of the two shutters are performed according to opposite directions at the beginning of the opening movement and at the end of the closing movement, i.e. during the sway phase. During the rest of the movement, the shutters move in the same direction.

The different movements of the movable panel 12 are controlled by means for moving the shutters 2, 3 inside the guide rails 114, 115.

The movement of the lower shutter 3 along the lower guide rail 115 is ensured by means of a control cable, or drive cable, 13 of the “push pull” type, itself driven by motor-driven means controlled by a user.

More specifically, the drive cable 13 is intended either to push on the lower shutter 3 (in the direction of the X axis, i.e. rearwards of the vehicle) to move the movable panel 12 from its closing-off position towards one of the opening positions, or to pull the lower shutter 3 (in a direction opposite to the X axis, i.e. forwards of the vehicle) to move the movable panel 12 from an opening position towards its closing-off position.

In this example, the drive cable 113 is pushed or pulled by a motor (not illustrated).

Figure 2:
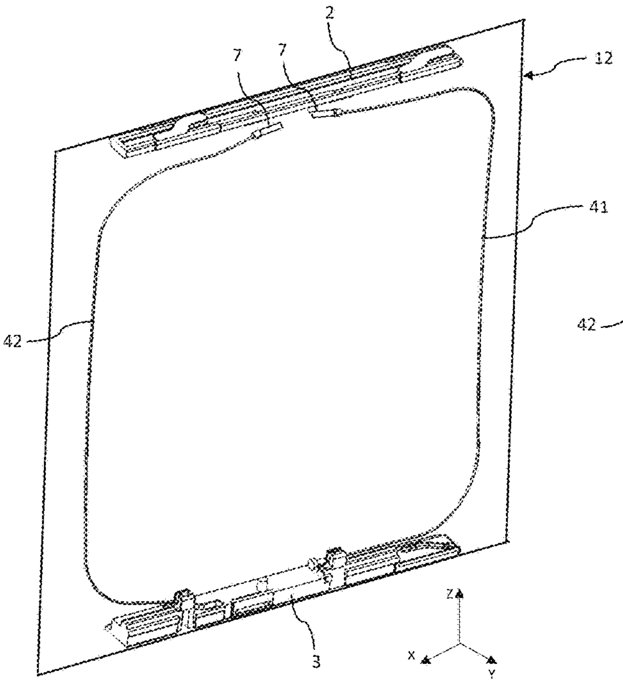
FIG. 2 illustrates a partial view of the closing off device of FIG. 1.

The movement of the upper shutter 2 along the upper guide rail 114 is synchronised with the movement of the lower shutter 3 by synchronisation means, in this example, in the form of two synchronisation cables (visible in FIG. 2, in particular). In other words, the movement of the lower shutter is transmitted to the upper shutter by the synchronisation cables.

Figure 3:
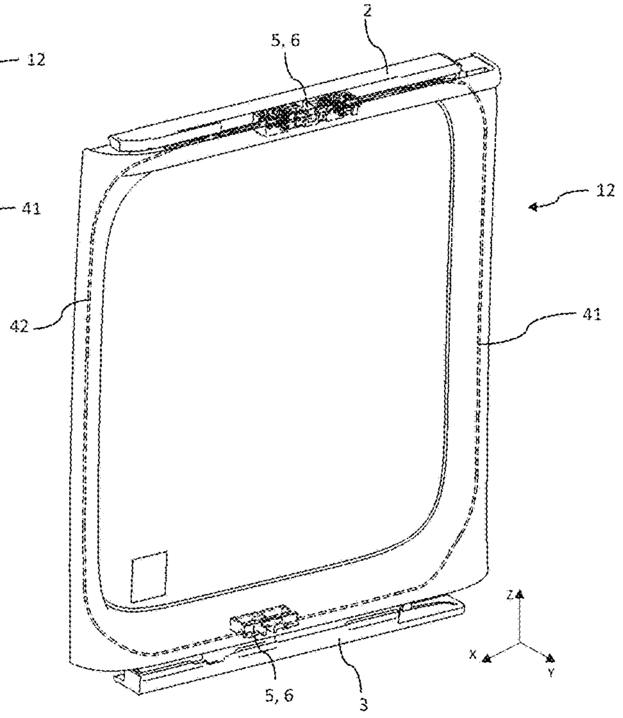
FIG. 3 illustrates a partial view of a closing off device, or flush opening, according to the proposed technique.

FIGS. 2 and 3 illustrate a partial view of the movable panel 12 of the closing off device 1 showing the route of the synchronisation cables 41, 42 of the lower shutter 3 up to the upper shutter 2 through the frame of the movable panel 12.

Hence, the synchronisation cables 41, 42 connect the upper 2 and lower 3 shutters to one another so as to ensure an optimum movement of the shutters, and therefore of the movable panel 12, when the drive cable 13 is actuated.

In FIG. 2, illustrating the prior art, the aforementioned synchronisation cables 41, 42 are connected directly on the shutters 2, 3, or via a tension spring, for example.

FIG. 3 partially illustrate the closing off device according to the proposed technique wherein the upper 2 and lower 3 shutters carry means for securing 5 and tensioning 6 the aforementioned synchronisation cables 41, 42, which will be described in more details later on in this description, in connection with the first and second embodiments of the proposed technique.

Figure 4:
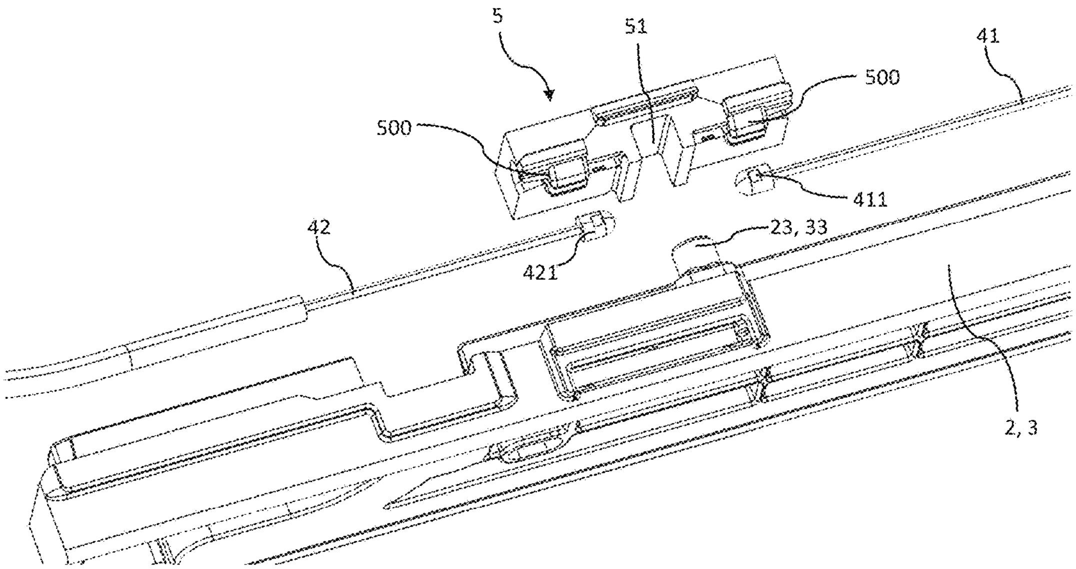
FIG. 4 illustrates an exploded view of the means for securing the synchronisation cables on the shutters according to the proposed technique, before assembly.
Figure 5:
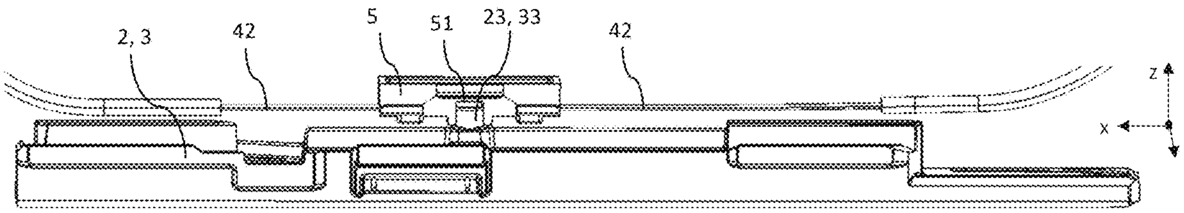
FIG. 5 illustrates a top view of the securing means of FIG. 4, after assembly.

Description of an Example of Means for Securing the Synchronisation Cables on the Shutters FIGS. 4 and 5 illustrate the means 5 for securing the synchronisation cables 41, 42 on the shutters 2, 3 according to an embodiment of the proposed technique.

These securing means 5 are in the form of a slider 5 mounted on each of the shutters 2, 3. Hence, the slider 5 allows linking one end of the front 41 and rear 42 cables on the shutter 2, 3.

More particularly, the slider 5 has a fork, or groove, 51 located substantially at the middle of the slider 5. The fork 51 is capable of cooperating with a securing pin, or finger, 23, 33 carried by the shutters 2, 3.

When the slider 5 is mounted on the shutter 2, 3, the fork 51 enables a translation of the slider! relative to the shutter 2, 3, substantially according to the Y axis. In other words, the fork 51 enables a sliding guidance of the slider 5 relative to the shutter 2, 3, during the transverse movement (according to the Y axis) of the shutters 2, 3.

Preferably, the slider 5 is slid/moved transversely with respect to the shutters 2, 3. In other words, the slider 5 moves according to an axis (the Y axis) perpendicular to the axis of movement of the shutters 2, 3 (the X axis).

This degree of freedom enables the slider to absorb/compensate the movement of the shutter 2, 3 according to the Y axis during the movement of the movable panel 12 between the sliding plane and the plane defined by the fixed part 11. In other words, the slider 5 does not move transversely (according to the Y axis) relative to the frame 121 of the movable panel 12, since the movement according to the Y axis of the shutter 2, 3 is performed within the fork 51. Hence, the slider 5 does not move according to the X axis.

The absorption of the movement of the shutters 2, 3 according to the Y axis by the fork 51, during the sway, enables the synchronisation cables 41, 42 to always move, i.e. pull or act, in their respective axis, namely the X axis.

In one variant (not illustrated), it may be considered to place the securing pin 23, 33 on the slider and the fork 51 on the shutter 2, 3.

Thus, the present technique allows limiting, and possibly suppressing, the frictions of the synchronisation cables with the shutters and the frame of the movable panel so as to minimise the operating noises during opening and closing of the movable panel 12.

The present technique also allows reducing, and possibly suppressing, the distortions of the opening/closing kinematics related to the sway of the movable panel 12 relative to the fixed part 11 of the closing off device 1.

In this example, the slider 5 has, on each side of the fork 51, a compartment 500 for receiving the head 411, 421 of the front 41 and rear 42 synchronisation cables. In this example, the tension of the synchronisation cables 41, 42 is not therefore finely controlled during mounting.

Two variants of the invention, further implementing means for controlling the tension, are described hereinafter.

Description of a First Embodiment of the Means for Controlling the Tension of the Synchronisation Cables FIGS. 6 to 10 illustrate the means 6 for controlling the tension of the synchronisation cables of the closing off device 1 according to a first embodiment.

As described before, the securing means 5 are herein in the form of a slider 5 mounted on the shutters 2, 3. More particularly, the slider 5 has a fork, or groove, 51 located substantially at the middle of the slider 5. The fork 51 is capable of cooperating with a securing pin, or finger, 23, 33 carried by the shutters 2, 3. When the slider 5 is mounted on the shutter 2, 3, the fork 51 enables a translation of the slider 5 relative to the shutter 2, 3, according to the Y axis.

This degree of freedom enables the slider to absorb/compensate the movement of the shutter 2, 3 according to the Y axis during the movement of the movable panel 12 between the sliding plane and the plane defined by the fixed part 11. Thus, the slider 5 moves only according to the X axis so that the synchronisation cables 41, 42 always pull/act in their axis, namely the axis.

Thus, the slider 5 limits the frictions of the synchronisation cables with the shutters and the frame of the movable panel so as to minimise the operating noises during opening and closing of the movable panel 12.

The slider 5 also allows reducing, and possibly suppressing, the distortions of the opening/closing kinematics related to the sway of the movable panel 12 relative to the fixed part 11 of the closing off device 1.

The slider 5 has, on each side of the fork 51, means 6 for controlling the tension of the synchronisation cables 41, 42.

In this embodiment, the means 6 for controlling the tension of the synchronisation cables 41, 42 are in the form of means for setting the position of the hooking point of one end of the synchronisation cable in the slider 5.

The slider 5 has a compartment 501 for receiving the means for setting the position of the hooking point inside the slider 5. The means for setting the position of the hooking point inside the slider 5 are herein in the form of a tensioner 600.

Thus, the slider 5 has a compartment 501 for receiving the tensioner 600. The slider 5 is substantially identical on each side of the fork 51. In this example, the slider 5 therefore comprises two receiving compartments 501 so as to receive two tensioners 600. Each tensioner 600 allows acting on one end of a synchronisation cable 41, 42.

The receiving compartment 501 has, over at least two opposite inner lateral faces, a series/plurality of blocking teeth, or projections, 502.

In this example, each of these lateral faces has four blocking teeth 502 which extend towards the interior of the compartment 501. In other words, these blocking teeth 502 project substantially perpendicularly to the longitudinal axis of the slider 5.

Flexible blades 503 ensure guidance and centring of the tensioner 600 in the direction of fitting the slider 5 within the receiving compartment 501.

The slider 5 is capable of cooperating the tensioners 600. More specifically, the tensioners 600 allow setting the tension of the synchronisation cables, regardless of their length, so as to avoid a shift between the movements of the two shutters 2, 3. The tensioners 600 allow balancing the tension between the two synchronisation cables 41, 42 in order to optimise the synchronised movement of the shutters 2, 3.

Each end of the synchronisation cables 41, 42 is secured to a tensioner 600 which, in cooperation with the slider 5, allows setting/adjusting the tension of the synchronisation cables 41, 42.

The tensioner 600, which is preferably made in one-piece, is in the form of a substantially T-like shaped part wherein the vertical bar 601 of the T has an inner channel 602*a* for the passage of a synchronisation cable 41, 42. The free end of the vertical bar 601 of the T has a compartment 602*b* for holding the head 411, 421 of the synchronisation cable 41, 42.

Figure 6:
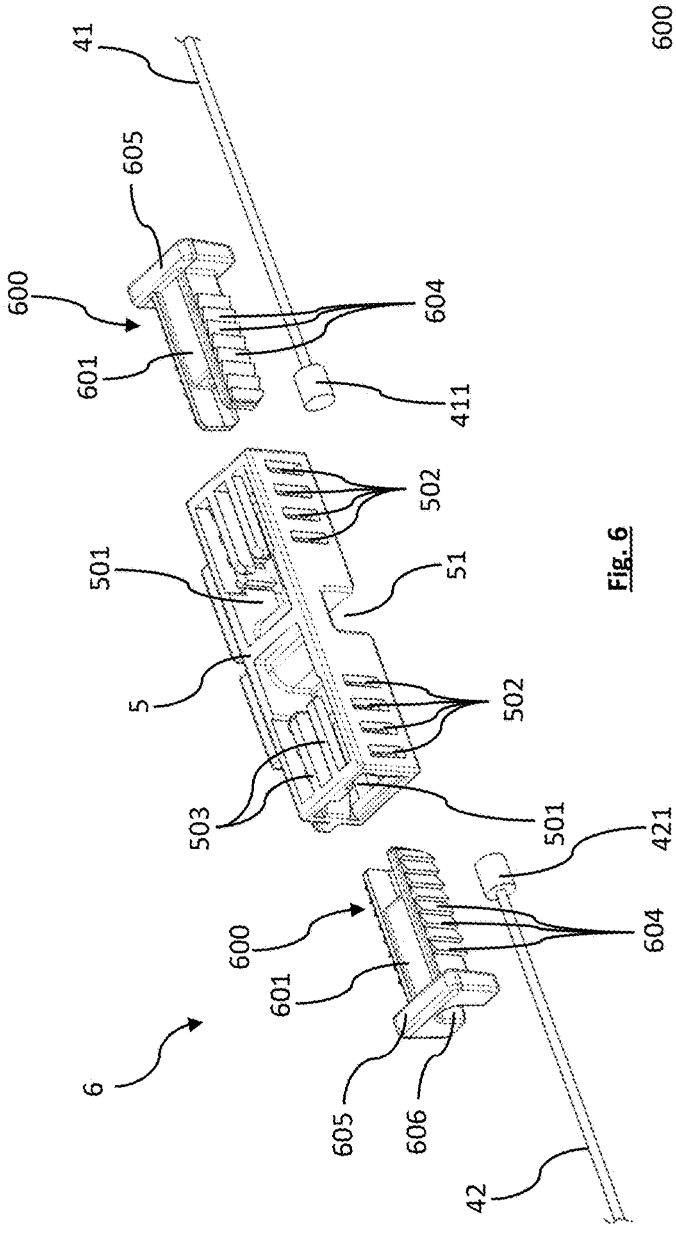
FIG. 6 illustrates an exploded top view of the tensioning means of the closing off device of FIG. 3, showing an example of a slider and of tensioners according to the first embodiment of the proposed technique.

In this example, the head 411, 421 of the synchronisation cable 41, 42 is clipped or snap-fitted into a holding compartment 602*b* (visible in FIGS. 5 and 6 in particular). Other solutions for securing the head 411, 421 of the synchronisation cable 41, 42 may be considered.

The crossbar 605 of the T of the tensioner 600 forms a stop allowing stopping/limiting the insertion/fitting of the tensioner 600 into the slider 5. This stop 605 comprises a notch 606 for the passage of the synchronisation cable 41, 42 extending in line with the channel 602*a*.

Thus, to secure the end of a synchronisation cable 41, 42 to the tensioner 600, all it needs is to insert the head 411, 421 of the synchronisation cable 41, 42 in the holding compartment 602*b* and to place/guide the synchronisation cable 41, 42 through/in the channel 602*a* and the notch 606 of the tensioner.

The synchronisation cable is then firmly held with the tensioner 600. Suh a tensioner 600 enables a simple and reliable assembly of the synchronisation cable 41, 42.

The tensioner 600 further has, over two opposite lateral faces of the vertical bar if the T, a series/plurality of blocking lugs, or recesses, 604 configured to cooperate with the blocking teeth 502 formed in the receiving compartment 501 of the slider 5. Hence, the tensioner 600 may take at least two distinct positions in the receiving compartment 501, so as to enable setting of the tension of the synchronisation cable 41, 42.

The cooperation of the blocking teeth 502 of the slider 05 with the blocking lugs 604 of the tensioner 600 allow locking the position of the tensioner 600 in the receiving compartment 501. Hence, the removal of the tensioner 600 is prevented by the cooperation of the blocking teeth 502 and recesses 604. Hence, this prevents loosening of the synchronisation cables 41, 42.

In this example, each of said faces of the tensioner 600 comprises eight blocking lugs 604 each corresponding to a distinct position of the tensioner 600 in the compartment 501, each of these positions of the tensioner 600 corresponding to a setting position of the tension of the synchronisation cable 41, 42. Of course, a different number of lugs may be considered.

Figure 7:
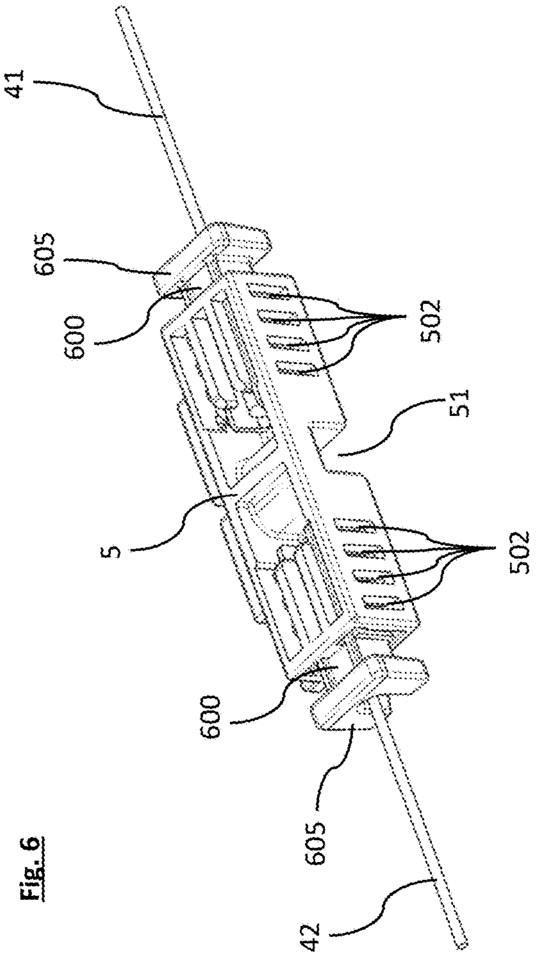
FIG. 7 illustrates a perspective view of the tensioning means of FIG. 6, after assembly.

After securing the end of the synchronisation cable 41, 42 with the tensioner 600, the tensioner 600 may be inserted into the slider 5, as illustrated in FIGS. 6 and 7.

Hence, the tension of the synchronisation cable depends on the depth of insertion of the tensioner 600 into the compartment 501 of the slider 5. Hence, setting of the tension of the synchronisation cable 41, 42 is very simple to perform. In addition, the different blocking lugs 604 allow obtaining a relatively fine setting of the tension of the synchronisation cable 41, 42.

Thus, the slider 5, mounted on one of the shutters 2, 3 allows fastening one end of each synchronisation cable 41, 42 to the shutter. After fastening on the shutters 2, 3, the sliders 5 and the tensioners 610 allow linking the two synchronisation cables 41, 42 to one another simply and effectively and thus ensuring an optimum movement of these during opening/closing of the movable panel 12.

In this manner, the deteriorations (wear, noise, etc.) of the shutters, of the synchronisation cables and of the frame 121 of the movable panel 12 are avoided.

Description of a Second Embodiment of the Means for Controlling the Tension of the Synchronisation Cables The second embodiment of the proposed technique refers to FIGS. 11 to 22.

Figures 11, 12, 13:
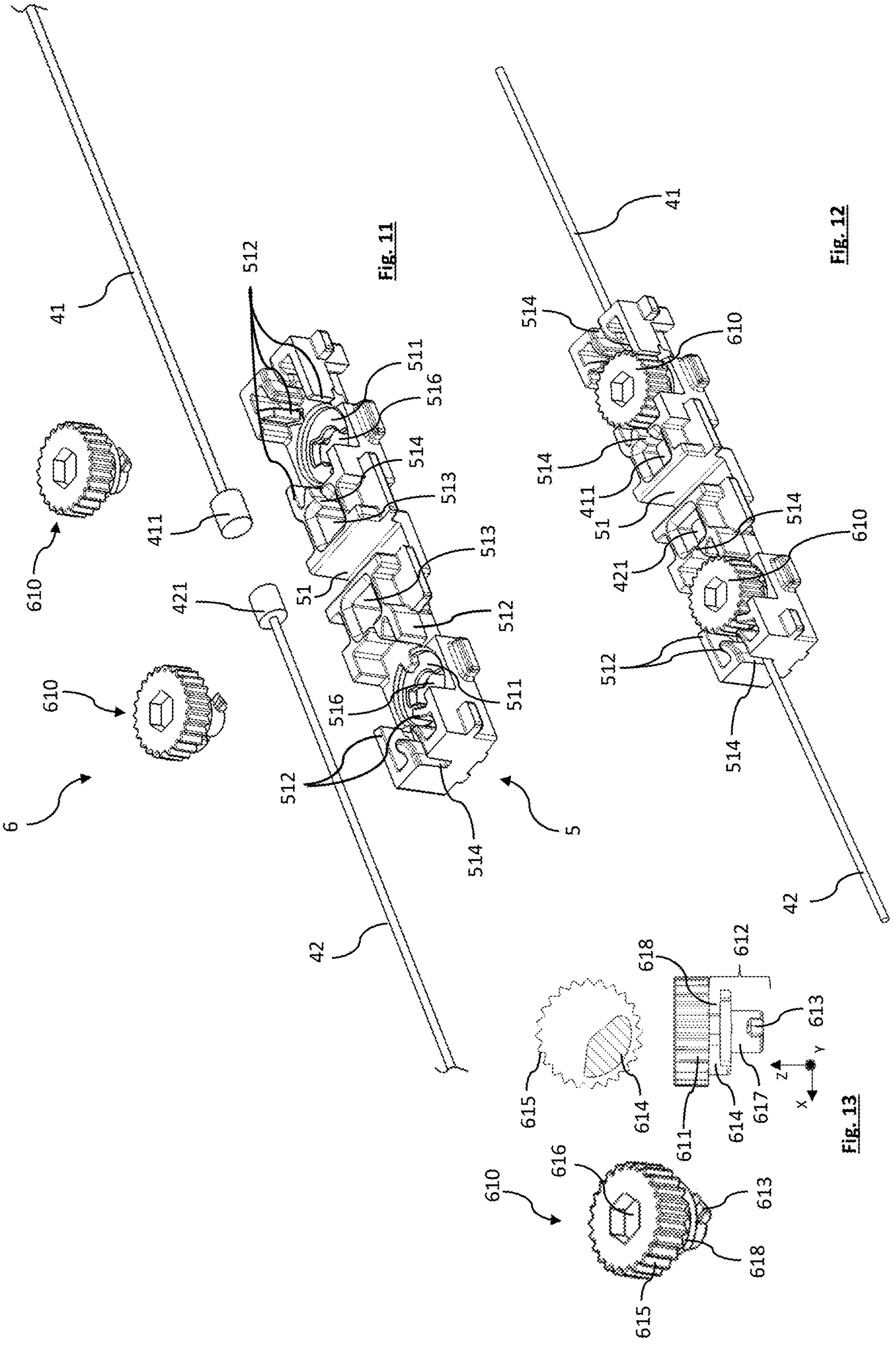
FIG. 11 illustrates an exploded bottom view of the tensioning means of the closing off device of FIG. 6, showing an example of a slider and of tensioners according to the second embodiment of the proposed technique.
FIG. 12 illustrates a perspective bottom view of the slider and of the tensioners of FIG. 11, after assembly.
FIG. 13 shows a perspective view, a top view and a side view of the tensioner of the tensioning means according to the second embodiment.
Figure 14:
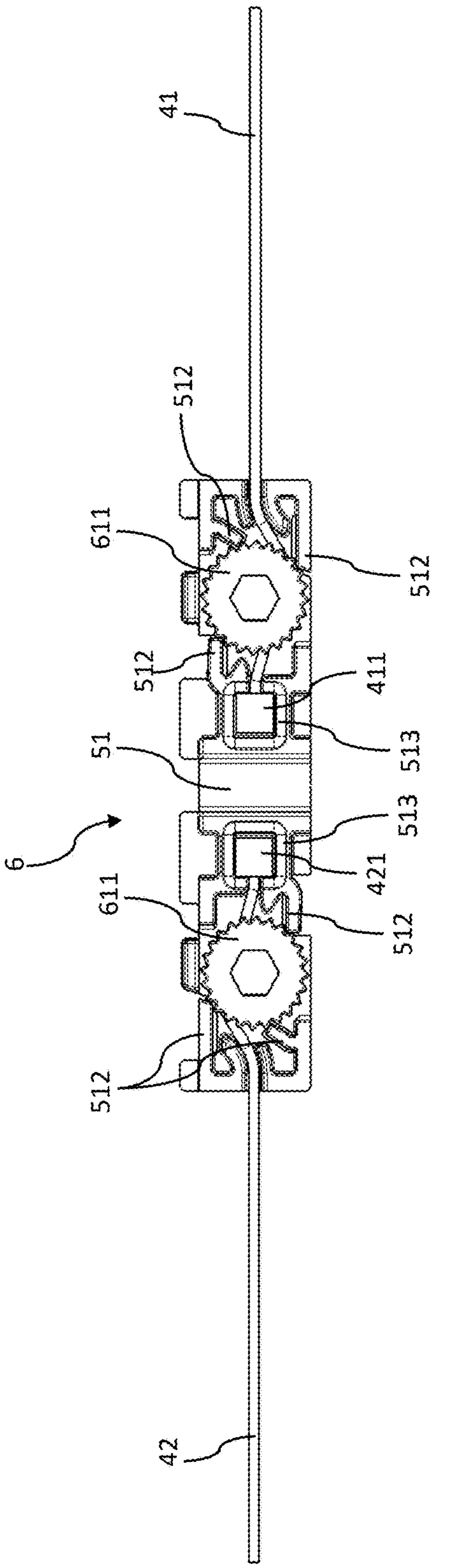
FIG. 14 illustrates a top view of the slider and of the tensioners of FIG. 11, after assembly.

In particular, FIGS. 11, 12 and 14 illustrate the means 6 for controlling the tension of the synchronisation cables of the closing off device 1 according to a second embodiment.

As described before, the securing means 5 are herein in the form of a slider 5 mounted on the shutters 2, 3. More particularly, the slider 8 has a fork, or groove, 51 located substantially at the middle of the slider 5. The fork 51 is capable of cooperating with a securing pin, or finger, 23, 33 carried by the shutters 2, 3. The fork 51 enables, when the slider 5 is mounted on the shutter 2, 3, a translation of the slider 5 relative to the shutter 2, 3, according to the Y axis.

This degree of freedom enables the slider to absorb/compensate the movement of the shutter 2, 3 according to the Y axis during the movement of the movable panel 12 between the slide plane and the plane defined by the fixed part 11. Thus, the slider 5 does not move according to the X axis so that the synchronisation cables 41, 42 always pull/act in their axis, namely the X axis.

Thus, the slider 5 limits the frictions of the synchronisation cables with the shutters and the frame of the movable panel so as to minimise the operating noises during opening and closing of the movable panel 12.

The slider 5 also allows reducing, and possibly suppressing, the distortions of the opening/closing kinematics related to the sway of the movable panel 12 relative to the fixed part 11 of the closing off device 1.

The slider 5 has, on each side of the fork 51, means for controlling the tension 6 of the synchronisation cables 41, 42.

In this embodiment, the means 6 for controlling the tension of the synchronisation cables 41, 42 are in the form of means for setting the length of the portion of the synchronisation cable inside the slider 5.

The slider 5 has a compartment 511 for receiving the means for setting the length of the portion of the synchronisation cable inside the slider 5. The means for setting the length of the portion of the synchronisation cable inside the slider 5 are herein in the form of a tensioner 610.

The slider 5 has, on each side of the fork 51, a compartment 511 for receiving a tensioner 610. The slider 5 is substantially symmetrical on each side of the form 51 (symmetry according to the longitudinal axis of the fork).

The receiving compartment 511 is substantially cylindrical and allows receiving the tensioner 610 by the lower face of the slider 5. The receiving compartment 511 has a series/plurality of blocking lugs, or projections, 512 over these edges.

In this example, three blocking lugs 512 are distributed over the edge/perimeter of each receiving compartment 511. These blocking lugs 512 extends towards the inside of the compartment 511. In other words, these blocking lugs 512 project substantially perpendicularly to the longitudinal axis of the receiving compartment 511.

Furthermore, in this embodiment, the slider 5 has, between the fork 51 and compartments 511 for receiving the tensioners 610, a compartment 513 for holding the head 411, 421 of a synchronisation cable 41, 42.

In this example, the head 411, 421 of the synchronisation cable 41, 42 is clipped or snap-fitted into a holding compartment 513 (visible in FIG. 11 in particular). Other solutions for securing the head 411, 421 to the synchronisation cable 41, 42 may be considered.

Figure 8:
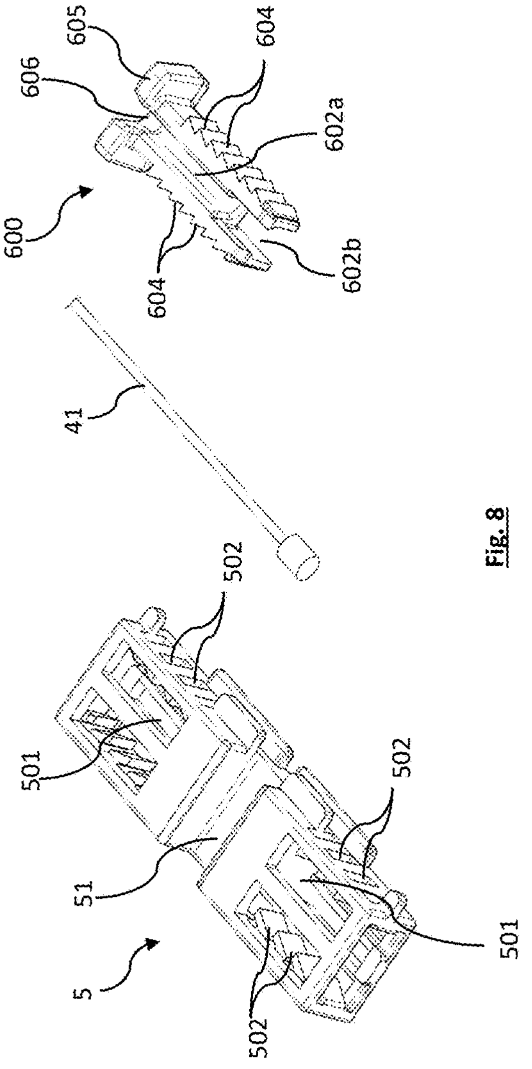
FIG. 8 illustrates another exploded bottom view of the slider and of the tensioners of FIG. 6.
Figure 9:
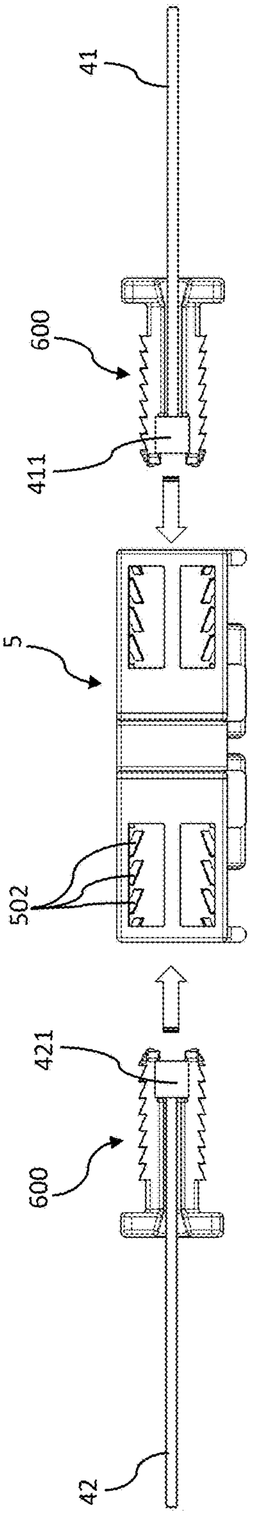
FIG. 9 illustrates a top view of the tensioning means of FIG. 6, showing how the tensioners are assembled with the slider according to the first embodiment.

The slider 5 also has notches 514 for the passage of the synchronisation cable 41, 42 (visible in FIGS. 8 and 9). These notches 514 are located on either side of the receiving compartment 511. More specifically, a first notch 514 is located between the compartment 511 for receiving the tensioner 610 and the end edge of the tensioner 5, whereas a second notch 514 is located between the compartment 111 for receiving the tensioner 610 and the compartment 513 for receiving the head 411, 421 of the synchronisation cable.

The slider 5 has an opening 516 formed at the bottom of the receiving compartment 511. This opening 516 has a circular central portion as well as two rectilinear portions located opposite one another, as visible in FIGS. 8, 16 and 17.

The slider 5 is capable of cooperating with the tensioning means 6 which, in this example, are in the form of a tensioner 610. In this example, the sider 5 comprises two receiving compartment 511 so as to receive two tensioners 610. Each tensioner 610 allows acting on a synchronisation cable 41, 42.

The tensioners 610 allow setting the tension of the synchronisation cables, regardless of their length, so as to avoid a shift between the movements of the two shutters 2, 3. The tensioners 610 allow balancing the tension between the two synchronisation cables 41, 42 in order to optimise the synchronised movement of the shutters 2, 3.

Each synchronisation cable 41, 42 cooperates with a tensioner 610 which allows varying the route of these in order to set/adjust the tension of the synchronisation cables 41, 42.

More specifically, the tensioner 610 allows setting the length of the portion of the synchronisation cable 41, 42 received inside the slider 5.

Figure 10:
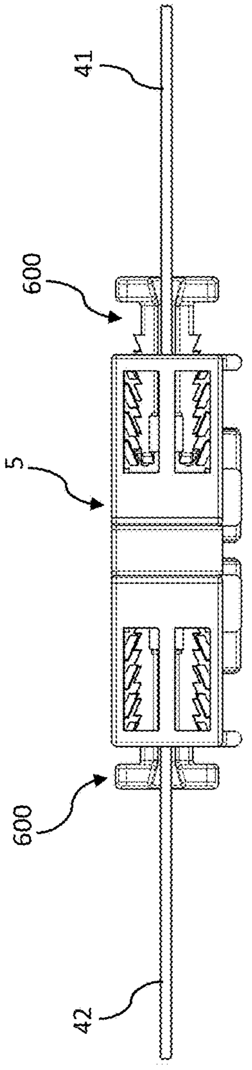
FIG. 10 illustrates a top view of the slider and of the tensioners of FIG. 9, after assembly.

The tensioner 610, which is preferably made in one-piece, is in the form of a cylindrical knob illustrated in different angles in FIG. 10.

The tensioner 610 has a first portion, or gear wheel, 611, located on the upper portion of the tensioner. This cylindrical shaped gear wheel comprises, over its periphery, a plurality of blocking teeth 615 projecting perpendicularly to the longitudinal axis of the knob 610.

A recess 616 located on the upper face of the tensioner 610 is capable of receiving a tool (of the Allen key type in this example) allowing making the tensioner 610 pivot so as to set the tension of the synchronisation cables 41, 42, as detailed later on.

The tensioner 610 has, beneath the gear wheel 611 (according to the Z axis), a cam 612 having a groove 618 for the passage/reception of the synchronisation cable. Thus, when the tensioner 610 is received in the compartment 511 of the slider 5, the synchronisation cable 41, 42 passes in the first notch 514, in the groove 618 of the tensioner 610 and then in the second notch 514 up to the compartment 513 for holding the head 411, 412.

The cam 612 has a protuberance 614 which allows diverting the route of the synchronisation cable 41, 42. More specifically, this protuberance 614 allows lengthening the pathway/path of the synchronisation cable so as to increase the tension of the latter, as detailed in more details with reference to FIGS. 12 to 14. In other words, the protuberance 614 allows setting the length of the portion of the synchronisation cable 41, 42 received inside the slider 5.

The cam 612 has, beneath the groove 618, a cylindrical portion 617 intended to cooperate with the corresponding circular portion of the opening 516 formed in the compartment 511 for receiving the tensioner 610.

The second portion 617 has a locking finger 613 intended to cooperate with the opening 516 of the slider 5 in order to lock the tensioner 610 in the receiving compartment 513 formed in the slider 5.

As illustrated in FIGS. 18 to 22, the locking finger 613 passes through the opening 516 of the slider 5. Locking of the tensioner 610 with the slider 5 is obtained through a quarter-turn type rotation, which is performed upon tensioning of the synchronisation cable 41, 42, i.e. upon rotation of the tensioner 610.

In this example, locking of the tensioner 610 with the slider 5 is therefore obtained by implementation of a locking finger and through a quarter-turn type rotation. Other solutions for locking the tensioner 610 with the slider 5 may be considered. For example, this locking may be obtained by a clip or screw type blocking element.

In one variant, the tensioner 610 is mounted free in translation according to the Z axis in the compartment 511. In this case, it is the synchronisation cable 41, 42 which, when tensioned, prevents the tensioner 610 from coming out of the compartment 511 of the slider 5.

In this second embodiment, the installation of the synchronisation cable is done by fitting the head 411, 421 of the cable into the holding compartment 513 of the slider and then by guiding the synchronisation cable in the notches 514 of the slider 5 and in the groove 618 of the tensioner 610 and then by accommodating the tensioner 610 in its receiving compartment 511.

The synchronisation cable 41, 42 is then firmly held to the slider 5 and it also cooperates with the tensioner 610. Such an implementation enables an easy and reliable assembly of the synchronisation cable 41, 42 on the shutter 2, 3.

After assembly of the synchronisation cable 41, 42 with the tensioner 610 and the slider 5, the tension of the synchronisation cable 41, 42 could then be set, as illustrated in FIGS. 12 to 14.

To set the tension of the synchronisation cable 41, 42, all it needs is to make the tensioner 610 pivot in accordance with the arrows F1 to F3 of FIGS. 14 to 17 using a suitable tool.

This rotation of the tensioner 610 allows diverting/lengthening the route of the synchronisation cable 41, 42. More specifically, it is the protuberance 614 which allows lengthening the path of the cable. In other words, the protuberance 614 allows setting the length of the portion of the synchronisation cable 41, 42 received inside the slider 5.

According to this example, the rotation of the tensioner 610 also enables locking thereof with the slider 5. Indeed, as described before, this rotation enables the locking finger 613 to lock the tensioner 610 in accordance with FIGS. 18 to 22.

The blocking teeth 615 of the tensioner 610 are configured to cooperate with the blocking teeth 512 of the slider 5 so as to lock the position of the tensioner 610 with respect to the slider 5. Hence, rotation of the tensioner 610 in the reverse direction is prevented by cooperation of the blocking teeth 512 and 615.

Hence, the tension of the synchronisation cable 41, 42 depends on the rotation of the tensioner 610. Setting of the tension of the synchronisation cable 41, 42 is therefore very easy to perform. In addition, the different blocking lugs 615, each corresponding to a distinct setting position of the cable of the cable, allow obtaining a relatively fine setting of the tension of the synchronisation cable 41, 42.

Thus, the slider 5, mounted on one of the shutters 2, 3 allows fastening one end of each synchronisation cable 41, 42 to the shutter. After fastening on the shutters 2, 3, the sliders 5 and the tensioners 610 allow linking the two synchronisation cables 41, 42 to one another simply and effectively and thus ensuring an optimum movement of these during opening/closing of the movable panel 12.

In this manner, deteriorations (wear, noise, colour change) of the shutters, of the synchronisation cables and of the frame 121 of the movable panel 12 are avoided.

Other Aspects and Variants

The two embodiments of the means for controlling the tension of the synchronisation cables described hereinabove feature sliders respectively carrying means for setting the position of the hooking point of the synchronisation cable in the slider and means for setting the length of the portion of the synchronisation cable inside the slider.

In one variant, the means 6 for controlling the tension of the synchronisation cables 41, 42 may be in the form of a return spring 7 in FIG. 3, which allows adjusting the tension of the synchronisation cables. For this purpose, the end of the synchronisation cable is connected to the return spring 7, itself connected to the slider 5.

Thus, it is possible to control the tension of the two synchronisation cables.

Of course, it should be understood that it is possible that the slider cooperates only with one single tensioner or spring, and even with no tensioner or spring.

Hence, these variants allow adapting the proposed technique to any desired application. Hence, it is possible, where desired, to set the tension of only one or both of synchronisation cables. It is also possible to set the tension of the synchronisation cables at one or both of the ends of the cables. Hence, the device may have up to four tensioners/return springs so that all of the ends of the cables are adjustable.

In other words, the proposed technique allows setting the tension at:

- the end of one single synchronisation cable;
- both ends of one single synchronisation cable;
- both ends of the two synchronisation cables;
- the upper end of one cable and the lower end of the other cable;
- etc.

The above-described embodiments apply to a lateral wall of a motor vehicle.

The proposed technique may apply in the same manner to other structures having a wall in which an aperture is defined like, for example, a travel trailer or a camping-car.

In particular, the aperture may be formed in a lateral wall of the vehicle (for example for utility vehicles, minivans, estate vehicles, etc.), in a wall directed rearwards of the vehicle (for example for "pick-up" vehicles), or in a door.

It may consist of a separation bay of a vehicle.

What is claimed is:

1. A device for closing off an aperture formed in a structure, comprising:

a fixed panel, in which an opening is defined, and at least one sliding movable panel guided along two guide rails mounted on one face of said fixed panel, between a closing-off position, closing said opening, in a first plane defined by said fixed panel, called closing-off plane, and at least one opening position, in a second plane, called sliding plane, substantially parallel to said closing-off plane, each of said guide rails carrying at least one shutter guided in translation in said corresponding guide rail, each shutter comprising two guide tracks, configured to cooperate with two fixed pins carried by a frame of said movable panel, or alternatively two fixed pins configured to cooperate with two guide tracks, carried by a frame of said movable panel, actuation means acting on one of said shutters to ensure a translational movement of said shutters in said guide rails, and a passage of the movable panel from said closing-off plane into said sliding plane, and vice versa, synchronisation cables consisting of two cables, each circulating in one lateral edge of said frame and ensuring a synchronisation of said translational movement of said shutters, wherein a slider is mounted on each shutter and is movable relative to said corresponding shutter, each slider receiving one end of each of said synchronisation cables so as to connect each cable to the shutter, wherein each slider comprises a groove extending according to a first axis perpendicular to a second axis of translational movement of the shutters, said groove cooperating with a pin carried by the corresponding shutter, or wherein each shutter comprises a groove cooperating with a pin carried by the corresponding slider, so that each slider is slidably guided relative to the corresponding shutter according to said first axis perpendicular to said second axis of translational movement of said shutters, and so that movement of said ends of said synchronisation cables is always parallel to a plane defined by said movable panel during the translational movement of said shutters ensuring the passage of said movable panel from said closing-off position into said at least one opening position, and vice versa.

2. The closing off device according to claim 1, wherein at least one of said sliders comprises a return spring for controlling a tension of at least one of said synchronisation cables.

3. The closing off device according to claim 2, wherein at least one of said sliders comprises a tensioner for setting a position of a hooking point of at least one cable end in said corresponding slider and for controlling a tension of at least one of said synchronisation cables.

4. The closing off device according to claim 3, wherein said at least one tensioner receives the end of one of said synchronisation cables and penetrates into a receiving compartment formed in said slider, said tensioner being able to take at least two distinct positions in said receiving compartment, so as to enable setting of the tension of the corresponding cable.

5. The closing off device according to claim 4, wherein said tensioner has at least one blocking lug capable of cooperating with said receiving compartment.

6. The closing off device according to claim 5, wherein said receiving compartment has at least two blocking teeth capable of cooperating with said at least one blocking lug of said tensioner so that setting of the tension of said synchronisation cable depends on a depth of insertion of the tensioner in said compartment of said slider.

7. The closing off device according to claim 3, wherein said tensioner allows setting a length of a portion of at least one of said cables inside said slider.

8. The closing off device according to claim 7, wherein said tensioner comprises a cam imparting, according to a cam's position, a variable offset on said cable.

9. The closing off device according to claim 8, wherein said cam is secured to a gear wheel cooperating with at least two blocking lugs formed in said slider, and corresponding to at least two distinct tension settings.

10. A motor vehicle comprising at least one closing off device wherein each device for closing off an aperture formed in a structure, comprising:

a fixed panel, in which an opening is defined, and at least one sliding movable panel guided along two guide rails mounted on one face of said fixed panel, between a closing-off position, closing said opening, in a first plane defined by said fixed panel, called closing-off plane, and at least one opening position, in a second plane, called sliding plane, substantially parallel to said closing-off plane, each of said guide rails carrying at least one shutter guided in translation in said corresponding guide rail, each shutter comprising two guide tracks configured to cooperate with two fixed pins carried by a frame of said movable panel, or alternatively two fixed pins configured to cooperate with two guide tracks, carried by a frame of said movable panel, actuation means acting on one of said shutters to ensure a translational movement of said shutters in said guide rails, and a passage of the movable panel from said closing-off plane into said sliding plane, and vice versa, synchronisation cables consisting of two cables, each circulating in one of a lateral edges of said frame and ensuring a synchronisation of said translational movement of said shutters, wherein a slider is mounted on each shutter and is movable relative to said corresponding shutter, each slider receiving one end of each of said synchronization cables so as to connect each cable to the shutter, wherein each slider comprises a groove extending according to a first axis perpendicular to a second axis of translational movement of the shutters, said groove cooperating with a pin carried by the corresponding shutter, or wherein each shutter comprises a groove cooperating with a pin carried by the corresponding slider, so that each slider is slidably guided relative to the corresponding shutter according to said first axis perpendicular to said second axis of translational movement of said shutters, and so that a movement of said ends of said synchronisation cables is always parallel to a plane defined by said movable panel during the movement of said shutters ensuring the passage of said movable panel from said closing-off position into said at least one opening position, and vice versa.

* * * * *